United States Patent
Irwin et al.

(10) Patent No.: US 6,686,822 B2
(45) Date of Patent: Feb. 3, 2004

(54) POWDER COATED GENERATOR FIELD COILS AND RELATED METHOD

(75) Inventors: Patricia Chapman Irwin, Altamont, NY (US); Peter John Foley, Scotia, NY (US); Ronald Irving Longwell, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 09/910,010

(22) Filed: Jul. 23, 2001

(65) Prior Publication Data

US 2001/0048355 A1 Dec. 6, 2001

Related U.S. Application Data

(62) Division of application No. 09/552,310, filed on Apr. 19, 2000.

(51) Int. Cl.[7] .................................................. H01F 7/02
(52) U.S. Cl. ......................... 335/296; 310/180; 29/605
(58) Field of Search .................. 335/296; 336/302–306, 336/205; 428/383, 375–9; 310/180; 29/605

(56) References Cited

U.S. PATENT DOCUMENTS

| 3,726,005 A | 4/1973 | Prostor |
| 3,953,193 A | 4/1976 | Bessen |
| 3,957,454 A | 5/1976 | Bessen |
| 4,087,589 A | 5/1978 | Bessen |
| 4,562,164 A | 12/1985 | Miyazaki et al. |
| 4,819,322 A | * 4/1989 | Higuchi et al. ............... 29/605 |
| 5,418,265 A | * 5/1995 | Matsuzaki et al. .......... 523/440 |
| 5,650,031 A | 7/1997 | Bolon et al. |
| 5,710,475 A | 1/1998 | Irwin et al. |

FOREIGN PATENT DOCUMENTS

| EP | 0671805 A1 | * 9/1995 |
| JP | 358054606 A | 3/1983 |
| JP | 363094609 A | 4/1988 |
| JP | 409149575 A | 6/1997 |

* cited by examiner

*Primary Examiner*—Lincoln Donovan
(74) *Attorney, Agent, or Firm*—Nixon & Vanderhye P.C.

(57) ABSTRACT

A field coil for an electromagnetic rotor comprising multiple windings, each substantially entirely coated with a powder resin having a dielectric strength of at least in the range of 1000–1500 v/mil. A method of manufacturing a field coil for an electromagnetic rotor includes the steps of a) providing a field coil comprising multiple layers of copper bars; b) coating the multiple layers of the field coil with a powder resin having a dielectric strength of at least about 1000–1500 v/mil.; and c) curing the powder resin.

8 Claims, 2 Drawing Sheets

POWDER COATED GENERATOR FIELD COILS AND RELATED METHOD

This application is a division of application Ser. No. 09/552,310, filed Apr. 19, 2000, the entire content of which is hereby incorporated by reference in this application.

BACKGROUND OF THE INVENTION

This invention relates to the manufacture of generator electromagnetic rotors, primarily for use in power generating equipment.

In conventional processes for manufacturing generator electromagnetic rotors, the current-carrying copper coils (called "field coils") are laboriously hand insulated. Each coil must be insulated from other coils, and the entire coil package must be insulated from the steel of the rotor. Significant cost savings and productivity improvements could be realized with a simpler and faster insulation system.

SUMMARY OF THE INVENTION

It is now proposed to coat the copper field coils with a suitable powder resin. The coating can be applied by electrostatic spraying or other suitable process. In one technique, the field coils remain stationary while electrostatic spray guns revolve around the coils. In an alternative technique, the coils are carried along a conveyor through a power spray booth. With either technique, the resin powder can be cured onto the field coils using resistance heating, induction heating, convection heating or infrared heating. Two coats of the resin powder are required to ensure complete coverage. In addition, and depending on the coil configuration, the ends of the copper bars may be masked to prevent powder coverage where not desired (for example, at the site of the electrical connections).

Three classes of powder resins have the greatest potential for success in this particular application. They are epoxy powder coating resins, silicone powder coatings and hybrid systems of silicones/epoxies and silicones/acrylics. These materials have been shown to have high dielectric strength, impact strength, thermal stability, flexibility, chemical resistance and adhesion.

Thus, in accordance with its broader aspects, the present invention relates to a field coil for an electromagnetic rotor comprising multiple windings, each substantially entirely coated with a powder resin having a dielectric strength of at least in the range of 1000–1500 v/mil.

In another aspect, the winding relates to a field coil for an electromagnetic rotor comprising a field coil substantially entirely coated with a powder resin selected from a group consisting essentially of epoxy powder resins and silicone powder resins.

In another aspect, the invention provides a method of insulating a field coil for an electromagnetic generator comprising:

a. providing field coils comprising multiple layers of copper bars;

b. coating the multiple layers of the field coil with a powder resin having a dielectric strength of at least about 1000–1500 v/mil.; and c. curing the powder resin.

DETAILED DESCRIPTION OF THE INVENTION

Figure 1:
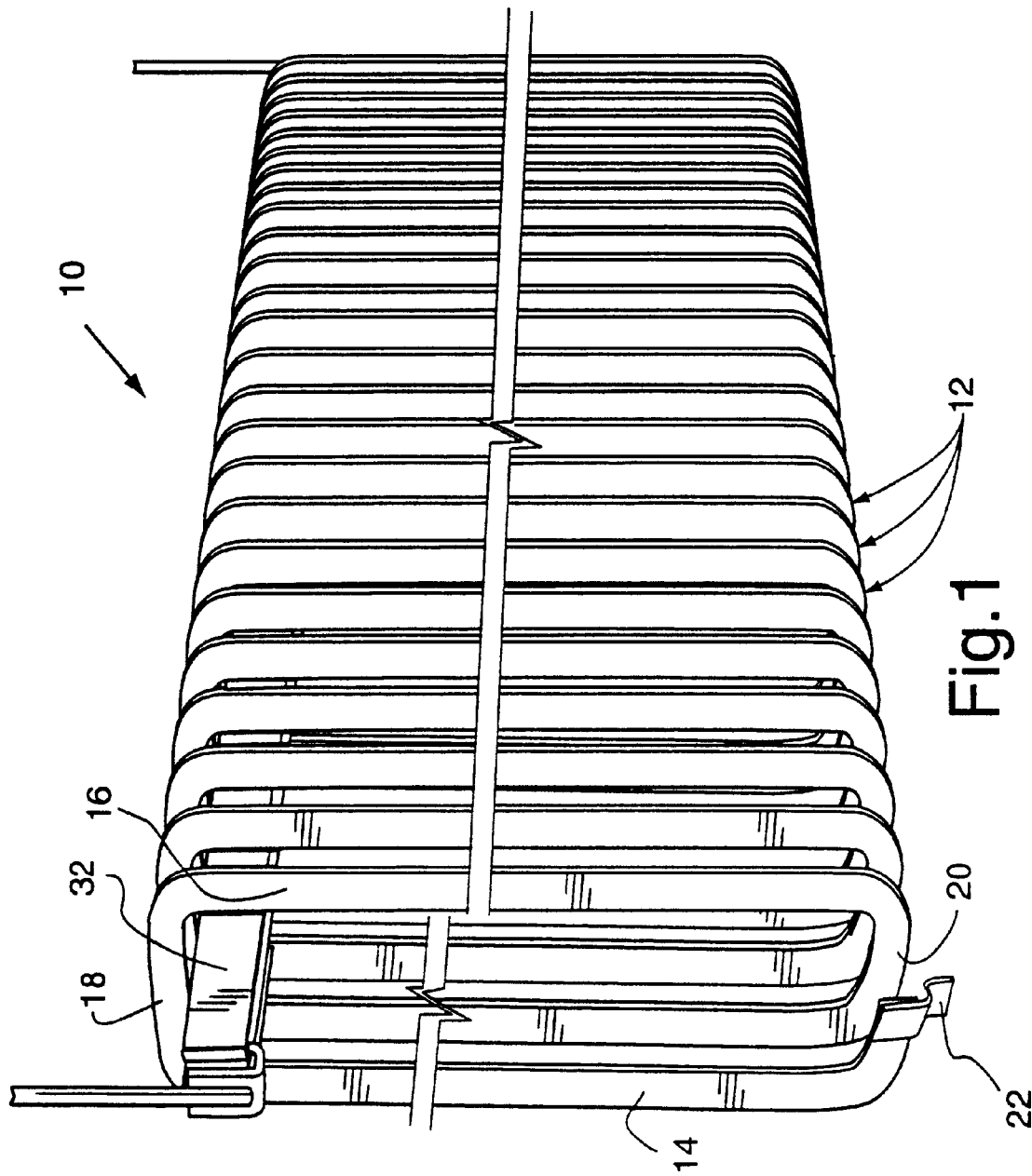
FIG. 1 is a partial perspective view of a known field coil configuration.

With reference to FIG. 1, a copper field coil 10 is shown that is of the helical wound type, with multiple layers or windings 12 formed from a single copper bar. The longitudinal sides 14, 16 of the windings are received within radial slots in the rotor body, while the ends 18, 20 of the windings project beyond the slots. In an alternative coil construction, each layer is comprised of a single winding or bar, the windings ultimately secured together in a stacked arrangement within the rotor slots. The present invention is equally applicable to either field coil construction.

The invention here relates to the elimination of known wrap-type insulation in favor of a powder resin coating. In an exemplary embodiment, two coats of a suitable resin powder coating are applied to the field coil 10. Prior to coating, the coil ends where the electrical connectors are located, are masked off, one such connector shown at 22. The masking can be done with Teflon® sleeves or other suitable means.

Three classes of powder resins are preferred as coating compositions for the field coils. They include epoxy powder resins, silicone powder, and silicone hybrid resin systems (silicone/epoxies and silicones/acrylics). Examples are provided in Table 1 below.

TABLE I

| Material | Dielectric Strength, v/mil | Impact Strength, inlb | Thermal Stability, use temp. | Flexibility, mandrel bend test | Chemical Resistance | Adhesion |
|---|---|---|---|---|---|---|
| 1.) 134 Epoxy | 1000 | >200 direct | 155 C. | Passes ¼" mandrel | $H_2S$, salt water | Good |
| 2.) 5555 Epoxy | 1100 | >200 direct | 180 C. | Passes ¼" mandrel | Oils and hydrocarbons | Good |
| 3.) 5230 Epoxy | 1100 | >160 direct | 155 C. | Passes ¼" mandrel | Oils and hydrocarbons | Good |
| 4.) 5388 Epoxy | 1200 | >160 direct | 180 C. | Passes ¼" mandrel | Oils and hydrocarbons | Good |
| 5.) Silicone | >1000 | >160 direct | 300 C. | Passes ¼" mandrel | Unknown | Fair |
| 6.) Silicone hybrid | 1500 | >220 direct | 220 C. | Passes ¼" mandrel | Oils | Good |

The epoxy powder compositions (items 1–4) are commercially available from 3M Corporation. The silicone powder coating composition (item 5) is a generic name and is currently less preferred. The Silicone hybrid (item 6) is commercially available from Crosslink Powder Coatings, Inc.

The compositions, particularly compositions 1–4 have high dielectric strength, impact strength, thermal stability, flexibility, chemical resistance and adhesion. The dielectric strength and thermal stability are critical factors, but chemical resistance and adhesion are important as well. The invention also contemplates modification of the base compositions through the addition of inorganic fillers that can enhance the properties of the final product, e.g., increased thermal conductivity of the coated copper bar and corona resistance of the coating.

Figure 2:
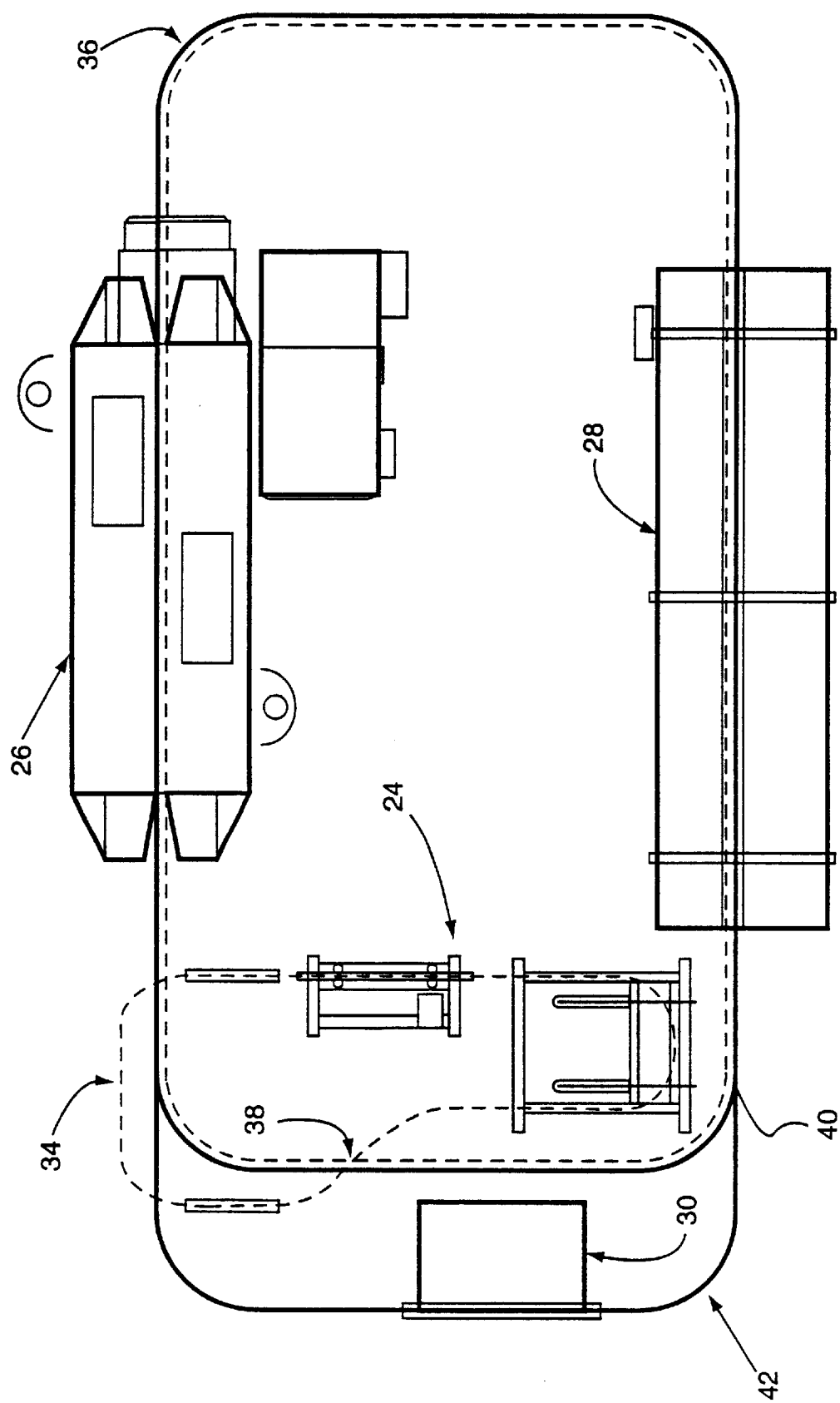
FIG. 2 is a flow diagram of a field coil coating process in accordance with this invention.

Turning to FIG. 2, a layout is schematically illustrated by which the coating process can be implemented.

This arrangement includes, generally, loading/unloading station 24; a powder coating station or booth 26; a curing oven 28; and an inverting station 30.

Coils to be coated may be moved by a suitable conveyor (not shown) to the loading/unloading station 24 where they are mounted, in succession, on suitable racks (one shown in FIG. 1 at 32). Each rack 32 is carried along a first circuit or track 34 to a main track or circuit 36 at switch point 38, and the coil is moved by conveyor, overhead tram or other suitable means, to the powder coating station or booth 26. After coating, the coil is moved along the track 36 to the curing oven 28 where the coating is cured by resistance heating, induction heating, convection heating or by infrared heating. Once cured, the coil is moved along track 36 to a switch point 40 where the rack 32 and coil 10 are moved to an extension track 42. At the inverting station 30, the coil 10 is removed from the rack 32, inverted, and placed back on the rack. This inversion of the coil insures that the part of the coil not contacted by the coating composition, i.e., that part of the end 16 of the coil that rests on the rack 32, will be coated. Subsequently, the rack with the inverted coil re-joins the main track or circuit 36 for travel through the powder coating station 24 where a second coat is applied. The rack and coil continue to the curing oven 26 before switching back to the track 34 at switch point 40 for removal of the coil from the rack 32 and transfer to a conveyor (not shown). The construction of the powder spray booth 26, curing oven 28, and inverting station 30 transfer or switch mechanisms at switch points 38, 40 are all within the skill of the art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of insulating a copper field coil for a generator electromagnetic rotor comprising:
    a) providing a helically wound field coil comprising multiple layers made from at least one copper bars;
    b) applying a first insulating coating over substantially the entirety of each of the multiple layers of the helically wound field coil, said coating comprising a powder resin having a dielectric strength of at least about 1000–1500 v/mil.; and
    c) curing the powder resin.

2. The method of claim 1 including masking an electrical connector of said field coil prior to step b).

3. The method of claim 1 wherein step b) further comprises applying a second insulating coating of said powder resin over said first coating.

4. The method of claim 1 wherein said powder resin comprises an epoxy powder resin.

5. The method of claim 1 wherein said powder resin comprises a silicone hybrid powder resin.

6. The method of claim 1 wherein step c) is carried out by resistance heating, induction heating, convection heating or infrared heating.

7. The method of claim 3 wherein said field coil is inverted prior to application of said second coating.

8. The method of claim 1 wherein said coil is supported on a rack during steps b) and c) and wherein after step c), the field coil is removed from the rack, inverted, and re-placed on the rack; and subsequently, a second coating is applied to said field coil, over said first coating.

* * * * *